United States Patent

Miyashita

[11] Patent Number: 5,862,467
[45] Date of Patent: Jan. 19, 1999

[54] SELECTIVE RECEPTION OF A RADIO SIGNAL IN A CELL ASSIGNED WITH ONE OF BIT RATES AND ONE OF SIGNAL FORMATS

[75] Inventor: Mafumi Miyashita, Tokyo, Japan

[73] Assignee: NEC Corporation, Tokyo, Japan

[21] Appl. No.: 772,561

[22] Filed: Dec. 26, 1996

[30] Foreign Application Priority Data

Dec. 27, 1995 [JP] Japan .................................. 7-340550

[51] Int. Cl.$^6$ .............................. H04L 7/00; H04Q 7/00
[52] U.S. Cl. .......................... 455/343; 455/38.3; 455/312
[58] Field of Search .................... 455/343, 312, 455/296, 38.1, 38.3; 340/825.44

[56] References Cited

U.S. PATENT DOCUMENTS

| | | | |
|---|---|---|---|
| 5,487,090 | 1/1996 | Ide ........................................ | 455/38.3 |
| 5,497,145 | 3/1996 | Yung et al. ............................ | 455/38.3 |
| 5,507,040 | 4/1996 | Eaton et al. ........................... | 455/343 |
| 5,537,100 | 7/1996 | Hallberg ................................ | 455/38.3 |
| 5,542,117 | 7/1996 | Hendricks et al. .................... | 455/343 |
| 5,613,218 | 3/1997 | Li et al. ................................. | 455/312 |
| 5,678,221 | 10/1997 | Cahill ..................................... | 455/312 |

FOREIGN PATENT DOCUMENTS 1-93221  4/1989  Japan .

*Primary Examiner*—Thanh Cong Le
*Assistant Examiner*—Edan Orgad
*Attorney, Agent, or Firm*—Scully, Scott Murphy and Presser

[57] ABSTRACT

In a selectively called radio receiver operable with battery saving and including a memory (21) for predetermined bit rates and predetermined formats (synchronizing signals, each accompanied by at least one identification code specific to the receiver) in correspondence to the bit rates a received radio signal of a good received state is demodulated into a demodulated signal including at least one selective call signal and having an input bit rate, which is judged as an adjudged bit rate if identical with one of the predetermined bit rates with an error allowed. Provided that the demodulated signal has at least one of the predetermined formats that corresponds to the adjudged bit rate and provided that the selective call signal includes the identification code according to the at least one of predetermined formats, a message signal is produced from the demodulated signal. Preferably, the receiver includes a control unit (17) comprising an information processing unit (19) controlling a bit rate judging circuit (23), a synchronizing signal detector (25), an identification code detector (27), and a message memory (29), all supplied with the demodulated signal.

8 Claims, 3 Drawing Sheets

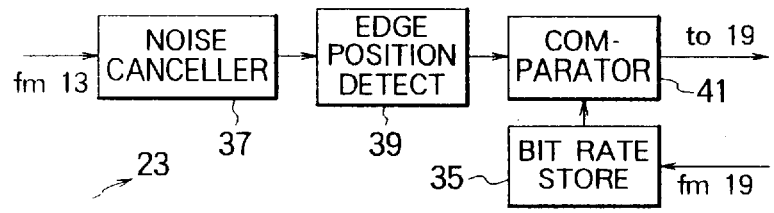
FIG. 2
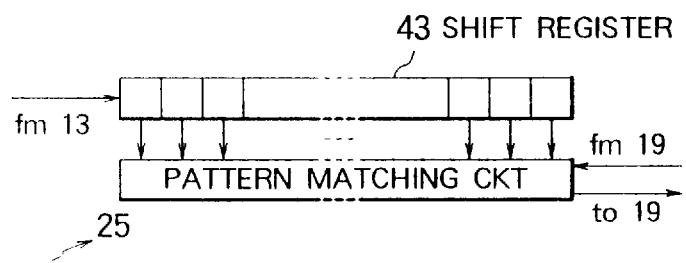
FIG. 3
| BR (bps) | FORMAT | RX COND |
|---|---|---|
| 512 | POCSAG | SC : 7CD215D8<br>iD : { 0320004<br>       0320012 |
| 1200 | POCSAG | SC : 7CD215D8<br>iD : { 0320000<br>       0320008 |
| 1200 | FORMAT 1 | SC : 1388067C<br>iD : 55555555 |
| 3250 | FORMAT 3 | SC : 8A20A0A8<br>iD : { 12345678<br>       87654321 |
FIG. 4

SELECTIVE RECEPTION OF A RADIO SIGNAL IN A CELL ASSIGNED WITH ONE OF BIT RATES AND ONE OF SIGNAL FORMATS

BACKGROUND OF THE INVENTION

This invention relates to selective reception of a radio signal with battery saving by a cellular mobile radio receiver movable in a plurality of cells assigned with radio signals of a plurality of signal formats. More particularly, this invention relates to a selective call radio receiving method and to a selectively called radio receiver of a received radio signal with automatic selection of one of the signal formats and in response to a selective call signal indicative of the radio receiver as a destination among a plurality of similar radio receivers which may present alive in the cells.

Such cellular selectively called radio receivers are widely used at present as mobile communication terminals, portable telephone handsets, and the like. For use by a great number of users, more and more higher bit rates have come into use. Moreover, various signal formats are in use.

A typical example of the signal formats is known as the POCSAG standard, which is specified in Autumn 1980 by the Post Office Code Standardisation Advisory Group (POCSAG) of London, the United Kingdom, as "Standard Message Formats for Digital Radio Paging". In connection with the POCSAG standard, a selectively called ratio receiver was invented by Motoki IDE, assignor to the present assignee, and was issued as U.S. Pat. No. 5,487,090. The specification of this Ide patent will be incorporated herein by reference.

A conventional selectively called ratio receiver is for operation in one signal format alone. In addition, the selectively called ratio receiver is operable at only one predetermined bit rate. It has consequently been impossible to use the conventional selectively called ratio receiver in a plurality of cells assigned with various signal formats and various bit rates even when the received radio signal of either another of the various signal formats or another of the various bit rates may have in one of the cells a good received state, such as no topographic disturbance, while the received radio signal of ones of the various signal formats and bit rates have an objectionable received state.

An improved selectively called radio receiver is disclosed in Japanese Patent Prepublication (A) No. 93,221 of 1989. This improved radio receiver is operable while carried across a plurality of cells in which radio signals of different radio frequencies are used with the radio signal of each radio frequency given a selected one alone of the various signal formats and a selected one alone of the various bit rates. The improved radio receiver comprises a state judging device for judging whether or not the received state is good in connection with a particular one of the radio frequencies that is used in one of the cells where a user has been attending to the radio receiver. It is possible to evaluate the received state by watching an electric field intensity, a bit error rate, and a state of synchronism between the radio signal and operation of the radio receiver.

If the received state is objectionable, the user might have moved from a first cell of the cells for the radio signal of a first radio frequency with a first signal format and a first bit rate to a second cell where the radio signal is given a second radio frequency with a second signal format and a second bit rate. In this event, the user manually deals with a switch of the improved selectively called ratio receiver to change the first radio frequency to the second radio frequency and thus from the first signal format and the first bit rate to the second signal format and bit rate. Alternatively, the improved selectively called radio receiver is automatically put into operation of searching among the different radio frequencies for the second radio frequency that gives a favorite received state of the received radio signal. The first signal format and the first bit rate are thereby switched to the second ones.

This radio receiver is excellently operable under the circumstances. The radio receiver is, however, insufficient for use in cells where radio signals of various radio frequencies are in use with the radio signal of each radio frequency used with a plurality of signal formats and a plurality of bit rates. That is, such a selectively called radio receiver is incapable of receiving in each cell a radio signal with a better received state than a radio signal which is currently received with a certain signal format and a certain bit rate.

SUMMARY OF THE INVENTION

It is consequently an object of the present invention to provide a selective call radio receiving method for use in cells where use is made of radio signals of various radio frequencies with the radio signal of each radio frequency used with a plurality of signal formats and a plurality of bit rates.

It is another object of this invention to provide a selective call radio receiving method which is of the type described and is capable of receiving in each cell one of the radio signals that is received as a received radio signal with a good received state.

It is still another object of this invention to provide a selective call radio receiving method which is of the type described and by which it is possible to automatically select one of a plurality of predetermined formats that is received with a best received state of the received radio signal.

It is yet another object of this invention to provide a selective call radio receiving method which is of the type described and by which it is possible to carry out automatic roaming about different signal formats used in two adjacent cells for the received radio signal.

It is a different object of this invention to provide a selectively called radio receiver by which implemented is a selective call radio receiving method of the type described.

Other objects of this invention will become clear as the description proceeds.

In accordance with an aspect of this invention, there is provided a selective call radio receiving method operable with battery saving and comprising the steps of (a) receiving a received radio signal and (b) demodulated signal reception controlling reception operation of a demodulated signal derived from the received radio signal, wherein: (a) the receiving step includes the step of judging a received state of the received radio signal to make, when the received state is good, the receiving step demodulate the received radio signal into the demodulated signal which includes at least one selective call signal and has an input bit rate, (b) the demodulated signal reception step comprising the steps of: (B1) judging whether or not the input bit rate is an adjudged bit rate which is substantially identical with one of a predetermined bit rates, the judging step producing a rate coincidence signal indicative of the adjudged bit rate when the input bit rate is the adjudged bit rate; and (B2) operation controlling responsive to the rate coincidence signal and reception operation in compliance with a signal format which is in conformity with the adjudged bit rate, provided that the selective call signal comprises a specific call signal which indicates that the reception operation should proceed.

In accordance with a different aspect of this invention, there is provided a selectively called radio receiver operable with battery saving and comprising (a) a receiver unit for receiving a received radio signal and (b) a control unit for controlling reception operation of a demodulated signal derived from the received radio signal, wherein: (A) the receiver unit includes state judging means for judging a received state of the received radio signal to make, when the received state is good, the receiver unit demodulate the received radio signal into the demodulated signal which includes at least one selective call signal and has an input bit rate; (B) the control unit comprising: (B1) rate judging means for judging whether or not the input bit rate is an adjudged bit rate which is substantially identical with one of a plurality of predetermined bit rates, the judging means producing a rate coincidence signal indicative of the adjudged bit rate when the input bit rate is the adjudged bit rate; and (B2) controlling means responsive to the rate coincidence signal for controlling the reception operation in compliance with a signal format which is in conformity with the adjudged bit rate, provided that the selective call signal comprises a specific call signal which indicates the radio receiver as a destination.

BRIEF DESCRIPTION OF THE DRAWING

FIG. 2 is a block diagram of a bit rate detector which is for use in the radio receiver illustrated in FIG. 1;

FIG. 3 is a block diagram of a synchronizing code detector for use in the radio receiver shown in FIG. 1;

FIG. 4 shows a content of a built-in memory in the radio receiver depicted in FIG. 1.

DESCRIPTION OF THE PREFERRED EMBODIMENT

Figure 1:
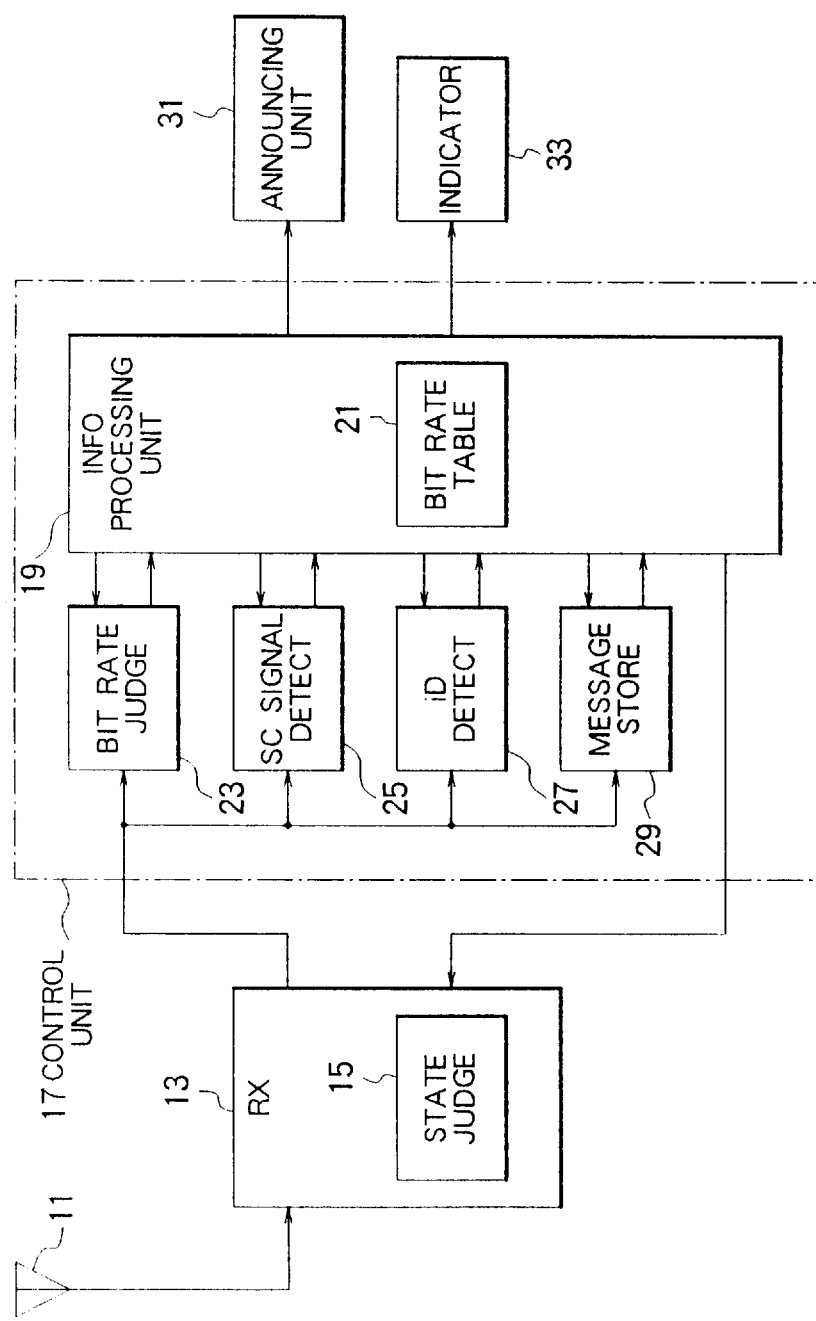
FIG. 1 is a block diagram of a selectively called radio receiver according to an embodiment of the instant invention.

Referring to FIG. 1, the description will begin with a selectively called radio receiver according to a preferred embodiment of the present invention. The radio receiver is movable across a plurality of cells in which radio signals are transmitted as transmission radio signals of a plurality of radio frequencies with a plurality of bit rates. Each transmission radio signal of a radio frequency carries a transmission information signal in one of a plurality of predetermined formats and at one of a plurality of predetermined bit rates.

The predetermined bit rates may be 512, 1200, and 3250 bps. For one of such bit rates, a typical one of the predetermined formats is a signal format according to the POC-SAG standard described heretobefore. In the manner described in detail in the Ide patent referred to hereinabove, a batch stream of batches includes a preamble. A plurality of batches follow the preamble. Each batch includes a synchronizing signal. In a first batch immediately following the preamble, the synchronizing signal is followed by a plurality of selective call signals and usually by at least one message signal. In each of succeeding batches, the synchronizing signal is followed by a plurality of message signals. One of the selective call signals in one of such batches streams may be a specific call signal which indicates the radio receiver under consideration as a destination of the message signal specified in the batches by the specific call signal. In this manner, synchronizing signals are defined by the predetermined formats. Furthermore, at least one selective call signal may be carried by the transmission radio signals to indicate the radio receiver in question as the destination.

In FIG. 1, the radio receiver is accompanied by a reception antenna 11 which catches the transmission radio signal or signals as an arriving radio signal. Connected to the reception antenna 11, a receiver unit (RX) 13 receives, as by frequency tuning, the arriving radio signal as a received radio signal with battery saving.

Included in the receiver unit 11, a state judging device 15 judges a received state of the received radio signal. Typically, the state judging device 15 watches an electric field intensity of the arriving radio signal. If the received state is good, the receiver unit 13 demodulates the received radio signal into a demodulated signal having a bit rate as an input bit rate and including at least one selective call signal and an input synchronizing signal in accordance with a signal format of the demodulated signal.

From the receiver unit 13, a control unit 17 is supplied with demodulated signal to deal with reception operation of the demodulated signal. In the control unit 17, an information (INFO) processing unit 19 partakes in the reception operation in the manner which will become clear as the description proceeds. The information processing unit 19 may be a microprocessor and includes a bit rate table 21 in which preliminarily stored are, among others, the predetermined bit rates used in the cells and the predetermined formats in correspondence to the predetermined bit rates.

In the control unit 17, the demodulated signal is supplied to a bit rate judging circuit 23, a synchronizing signal (SC) detector 25, an identification code (iD) detector 27, and a message store 29, all accessible to the bit rate table 21 to be operable in the manner which will be understood as the description proceeds. Included in the demodulated signal, the preamble puts through the bit rate judging circuit 23 the information processing unit 19 into operation of sending, among others, a battery saving control signal back to the receiving unit 13. In cooperation with certain ones of the synchronizing signal detector 25, the identification code detector 27, and the message store 29, the information processing unit 19 serves as a controlling unit which may be designated, when necessary, again by the reference numeral 17.

Put into operation by the preamble, the bit rate judging circuit 23 judges whether or not the input bit rate is an adjudged bit rate which is substantially identical with one of the predetermined bit rates stored in the bit rate table 21. The information processing unit 19 begins in response to the preamble to successively send the predetermined bit rate to the bit rate judging circuit 23. When the input bit rate is the adjudged bit rate, the bit rate judging circuit 23 supplies the information processing unit 19 with a rate coincidence signal indicative of the adjudged bit rate, which is a specific one of the predetermined bit rates.

In accordance with the predetermined formats, respectively, a plurality of predetermined synchronizing signals are preliminarily stored in the bit rate table 21 in correspondence to the predetermined bit rates. It may be mentioned here that at least one predetermined identification code is assigned to the radio receiver for use as the specific call signal described in the foregoing. The at least one predetermined identification code is preliminarily additionally stored in the bit rate table 21 in connection with each of the predetermined synchronizing signals. In this manner, the predetermined synchronizing signals are used according to this invention as respective representatives, in combination with the predetermined bit rates, of the predetermined formats.

Responsive to the rate coincidence signal, the information processing unit 19 deals further with the reception operation in compliance with one of the predetermined formats that is read from the bit rate table 21 as a specific signal format with reference to the specific one of the predetermined bit rates. The information processing unit 19 thereby searches in the bit rate table 21 ones of the predetermined synchronizing signals and of the predetermined identification code or codes as a specific synchronizing signal and a specific identification code that are in correspondence to the specific one of the predetermined bit rates. The information processing unit 19 delivers the specific synchronizing signal and the specific identification code to the synchronizing code detector 25 and the identification code detector 27, respectively.

Responsive to the specific synchronizing signal, the synchronizing signal detector 25 judges whether or not the demodulated signal includes an input synchronization signal which is identical with the specific synchronizing signal. The synchronizing signal detector 25 is capable of dealing substantially simultaneously with at least two of such specific synchronizing signals in the manner which will later be described. When the input synchronizing signal is thus detected at any rate, the synchronizing signal detector 25 delivers a synchronizing signal coincidence signal to the information processing unit 19, which establishes synchronism between the received radio signal and operation of the radio receiver, namely, of the receiver unit 13 and the control unit 17.

Responsive to the specific identification code, the identification code detector 27 judges whether or not the specific call signal is included in the at least one selective call signal to have an input identification code which is identical with the specific identification code. If the at least one selective call signal is collated with the specific identification code, the identification code detector 27 supplies the information processing unit 19 with a collation signal indicative of the fact that the received radio signal should be further processed by the controlling unit 19.

In the controlling unit 17, the information processing unit 19 is accompanied by an announcing unit 31 and an indicator unit 33. Responsive to the collation signal, the information processing unit 19 reads a message read signal to the message store 29 and energizes the announcing unit 31 to let a user of the radio receiver know, as by sound, light, or vibration, the fact that the transmission radio signal arrives at the radio receiver for attendance by the user.

In the meanwhile, the message store 29 is stored with a message signal which follows the specific call signal in the demodulated signal. Responsive to the message read signal which may alternatively be later delivered to the message store 29 by manual activation of a message switch by the user, the message store 29 delivers the message signal stored therein to the information processing unit 19 as a read message which is for auditory or visual indication by the indicator unit 33.

Turning to FIG. 2 with FIG. 1 continuously referred to, the bit rate judging circuit 23 comprises a bit rate store 35 in which the information processing unit 19 stores in response to the preamble the predetermined bit rates one by one as a stored bit rate successively by the rate coincidence signal. Supplied from the receiver unit 13 with the demodulated signal, a noise canceller 37 cancels noise from the demodulated signal to produce a noise cancelled signal.

Connected to the noise canceller 35, an edge position detector 39 detects points or positions of variation in a signal level of the noise cancelled signal to produce a bit rate signal representative of a detected bit rate. Connected to the bit rate store 35 and to the edge position detector 39, a comparator 41 compares the detected bit rate with the stored bit rate to deliver the rate coincidence signal to the information processing unit 19 when the detected bit rate is substantially identical with the stored bit rate. It is possible to understand that the comparator 41 passes the preamble to understand that the comparator 41 passes the preamble therethrough to the information processing unit 19 before storage of the stored bit rate in the bit rate store 35 because the preamble is usually a more alternating sequence of binary one and zero bits of a predetermined number of bits.

Describing operation as regards the production of the rate coincidence signal more in detail, the comparator 41 produces a preliminary signal when the detected bit rate is first in coincidence with the stored bit rate within a predetermined error range. It is possible to predetermine the error range in consideration of, for example, the received state. Responsive to the preliminary signal which may be kept in the comparator 41, the comparator 41 again compares the detected bit rate with the stored bit rate to ultimately produce the rate coincidence signal when the detected bit rate is in coincidence with the stored bit rate once more within the predetermined error range.

Further turning to FIG. 3 with FIG. 1 again continuously referred to, the synchronizing signal detector 25 comprises a shift register 43 into which the demodulated signal is shifted in bit by bit from the receiver unit 13. The shift register 43 has a plurality of stages, such as thirty-two stages, to bit-parallel produce an output pattern of the input synchronizing signal in compliance with the specific signal format by which the specific synchronizing signal is defined. The specific synchronizing signal is delivered by the information processing unit 19 from the bit rate table 21 and is stored in a pattern matching circuit 45 as a stored bit pattern. The pattern matching circuit 45 compares the stored bit pattern with the output bit pattern produced from time to time by the shift register 43. When the output bit pattern is in pattern match with the stored bit pattern, the pattern matching circuit 45 delivers the synchronizing signal coincidence signal to the information processing unit 19.

Referring afresh to FIG. 4 and contiguously to FIGS. 1 to 3, the bit rate table 21 is for memorizing a content comprising the predetermined bit rates and, in correspondence the predetermined formats and reception conditions for the reception operation. The reception conditions are specified by the predetermined synchronizing signals and the predetermined identification codes although it is possible to understand that the predetermined identification codes are not included in the predetermined formats.

More particularly, the predetermined bit rates are exemplified in or along a leftmost column indicated at its top by a legend "BR". For example, the predetermined bit rates are 512, 1200, and 3250 bps. The predetermined formats are exemplified in a middle column specified at its top by another legend "FORMAT" and are the POCSAG for 512 and 1200 bits, a format FORMAT 1 for 1200 bps, and another format FORMAT 3 for 3250 bps. In order to keep correspondence to the predetermined bit rates, the predetermined bit rate of 1200 pbs is stored in two memory locations listed along an upper and a lower row.

The reception conditions are exemplified in a rightmost column specified at its top by still another legend "RX COND" and consist of codes SC of the predetermined synchronizing signals and one or two predetermined identification codes iD which is or are specifically assigned to the radio receiver under consideration and are used in combination with each combination of the predetermined bit rates and formats. More in detail, the predetermined synchronizing signal is coded 7CD215D8 for two combinations of 512 pbs and the POCSAG and of 1200 bps and the POCSAG. For one and the other of the two combinations, use is made of two predetermined identification codes 0320004 and 0320012 and two other predetermined identification codes 0320000 and 0320008. For the predetermined format of FORMAT 1, only one predetermined identification code 55555555 is used. For the predetermined format of FORMAT 3, two predetermined identification codes 12345678 and 87654321 are used.

Figure 5:
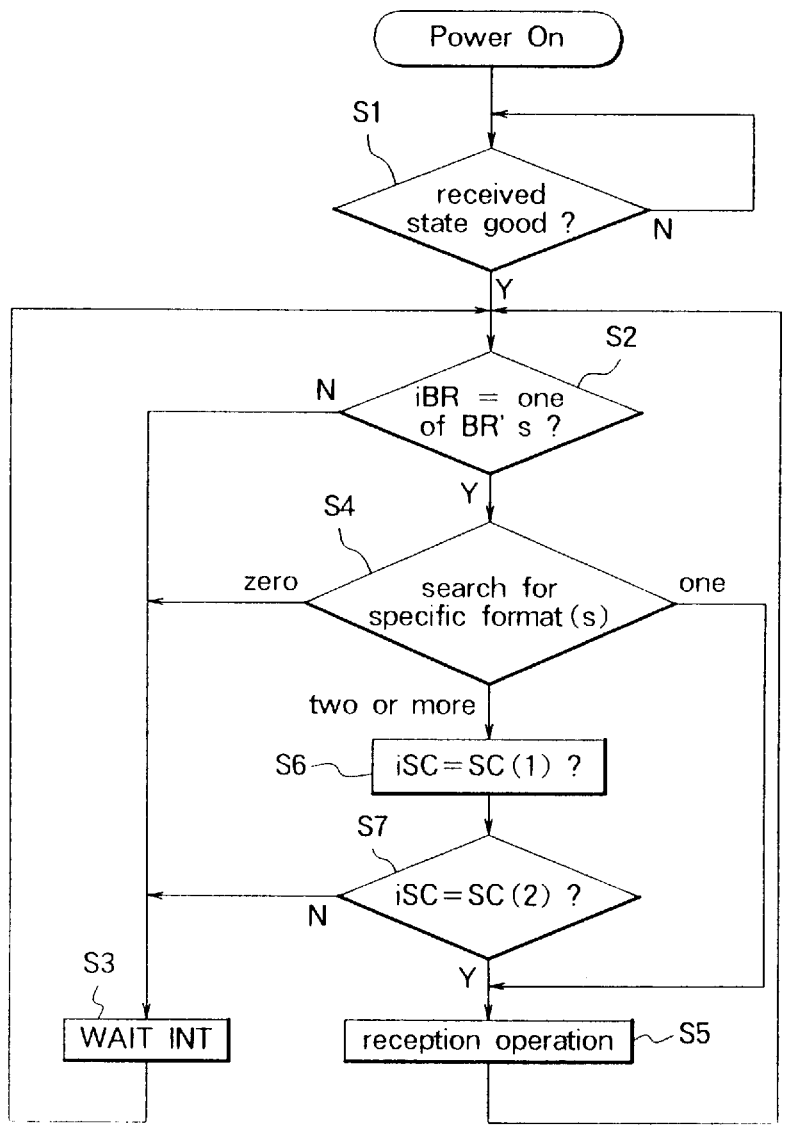
FIG. 5 shows a flow chart for use in describing operation of the radio receiver illustrated in FIG. 1.

Referring now to FIG. 5 with FIGS. 1 to 4 continuously referred to, the radio receiver automatically selects the specific signal format according to an algorithm shown as a flow chart. It may be mentioned here that the radio receiver includes a battery and a power switch although such are not depicted in FIG. 1. The battery may not necessarily be a built-in one.

The algorithm starts as indicated by "Power ON" when the power switch is rendered on. Together with the receiving unit 13, the state judging device 15 is put in operation of judging at a first step S1 whether or not the received state is good. If a result of judgement of such received states indicates that the received state is bad in connection with a radio signal currently received, the state judging device 15 is used for another radio signal. When the received state is found good, the preamble of the demodulated signal makes the battery saving control signal fully energize the receiving unit 13 and the control unit 17.

Supplied with the demodulated signal from the receiver unit 13 which is now fully energized, the bit rate judging circuit 23 judges at a second step S2 whether or not iBR (the input bit rate) is identical with one of BR's (the predetermined bit rates). If the input bit rate is equal to none of the predetermined bit rates, the receiving unit 13 and the control unit 17 are put at a third step S3 during a predetermined waiting interval (WAIT INT) in a waiting state where the battery saving control signal may keep the receiving unit 13, together with the control unit 17, in an only slightly energized state of capable of judging the received state of each received radio signal. The predetermined waiting interval is decided in consideration of all predetermined formats.

When the input bit rate is identical with the specific one of the predetermined bit rates at the second step S2, the information processing unit 19 searches at a fourth step S4 for at least one specific (signal) format among the predetermined formats. If no (zero) specific format is found, the fourth step S4 proceeds to the third step S3. When only one specific signal format is found (as exemplified in FIG. 4 along a top or first and a bottom or fourth row), the control unit 19 proceeds at a fifth step S5 with the reception operation in accordance with the only one specific signal format (namely, one predetermined synchronizing signal and one or two predetermined identification codes) either until appearance of a message end signal or until synchronism fails between the received radio signal and operation of the radio receiver.

It will now be surmised that two or more specific signals formats are formed at the fourth step S4. Merely for simplicity of the description, it is assumed that two specific signal formats are stored in the bit rate table 21 for each one of the predetermined bit rates in the manner exemplified in FIG. 4 along second and third rows from the top for the specific one (1200 bps) of the predetermined bit rates. It should be noted in this connection that at least one specific identification code is predetermined for each specific synchronizing signal.

Under the circumstances, the synchronizing signal detector 25 searches at a sixth step S6 for the input synchronizing signal (iSC) which is identical with a first one of the specific synchronizing signals SC(1). Regardless of identity of the input synchronizing signal with the first one, the synchronizing signal detector 25 checks at a seventh step S7 whether or not the input synchronizing signal is identical with a second one of the specific synchronizing signals.

When at least one specific synchronizing signal is found in either of the sixth and the seventh steps, the seventh step S7 proceeds to the fifth step S5 where the control unit 17 prosecutes the reception operation further in accordance with this at least one specific synchronizing signal and the specific call signal or signals following this synchronizing signal in the demodulated signal either until detection of the message end signal or until the received radio signal goes out of synchronism with the synchronizing signals interspersed in the demodulated signal. If the input synchronizing signal is identical with neither of the two or more specific synchronizing signals, the seventh step S7 proceeds to the third step S3.

What is claimed is:

1. A selective call radio receiving method operable with battery saving and comprising the steps of:

receiving a received radio signal and controlling reception of a demodulated signal derived from said received radio signal, said receiving step includes the steps of judging a received state of said received radio signal and when said received state is good, demodulating said received radio signal into said demodulated signal having an input bit rate, and which demodulated signal includes at least one selective call signal;

said demodulated signal reception controlling step comprising the steps of:

judging whether or not said input bit rate is an adjudged bit rate which is substantially identical with one of a plurality of predetermined bit rates, said rate judging step producing a rate coincidence signal indicative of said adjudged bit rate when said input bit rate is said adjudged bit rate; and enabling reception of said demodulated signal responsive to said rate coincidence signal in compliance with a signal format which is in conformity with said adjudged bit rate, provided that said selective call signal comprises a specific call signal which indicates that said demodulated signal reception should proceed;

said demodulated signal reception controlling step comprises the step of storing in a memory a plurality of predetermined formats in correspondence to said predetermined bit rates;

said judging step referring to said memory on judging said input bit rate as said adjudged bit rate, said operation controlling step referring to said memory to proceed, provided that said selective call signal comprises said specific call signal, with said reception operation in compliance with at least one of said predetermined formats that is in correspondence to said adjudged bit rate as said signal format;

said storing step further stores in said memory a plurality of predetermined synchronizing signals in correspondence to said predetermined bit rates;

said operation controlling step comprising the steps of:

detecting whether or not said demodulated signal includes an input synchronizing signal identical with at least one of said predetermined synchronizing signals that is in correspondence to said adjudged bit rate, said detection step producing a synchronizing signal coincidence signal when said input synchronizing signal is identical with said at least one of predetermined synchronizing signals; and further controlling responsive to said synchronizing signal coincidence signal said reception operation, provided that said selective call signal comprises said specific call signal, in compliance with one of said predetermined formats that is in correspondence to said adjudged bit rate and to said one of predetermined synchronizing signals.

2. A selective call radio receiving method as claimed in claim 1, wherein:

said stored step still further stores in said memory at least one predetermined identification code in correspondence to each of said predetermined synchronizing signals;

said further controlling step comprising the steps of:

collating responsive to said synchronizing signal coincidence signal and with reference to said memory an input identification code of said at least one selective call signal with said at least one predetermined identification code to produce a collation signal when said input identification code is collated with said at least one predetermined identification code; and further proceeding with said reception operation in response to said collation signal.

3. A selectively called radio receiver operable with battery saving and comprising a receiver unit for receiving a received radio signal and a control unit for controlling reception of a demodulated signal derived from said received radio signal, said receiver unit includes state judging means for judging a received state of said received radio signal and when said received state is good, said receiver unit demodulating said received state radio signal into said demodulated signal having an input bit rate, wand which demodulated signal includes at least one selective call signal;

said control unit comprising:

rate judging means for judging whether or not said input bit rate is an adjudged bit rate which is substantially identical with one of a plurality of predetermined bit rates, said rate judging means producing a rate coincidence signal indicative of said adjudged bit rate when said detected bit rate is said adjudged bit rate; and enabling means responsive to said rate coincidence signal for enabling said reception in compliance with a signal format that is in conformity with said adjudged bit rate, provided that said selective call signal comprises a specific call signal which indicates said radio receiver as a destination of said received radio signal;

said control unit comprises memory means for memorizing a plurality of predetermined formats in correspondence to said predetermined bit rates;

said rate judging means referring to said memory means on judging said input bit rate as said adjudged bit rate;

said controlling means referring to said memory means to proceed, provided that said selective call signal comprises said specific call signal, with said reception operation in compliance with at least one of said predetermined formats that is in correspondence with said adjudged bit rate as said signal format;

said memory means further memorizes a plurality of predetermined synchronizing signals in correspondence to said predetermined bit rates;

said control unit comprising:

synchronizing signal detecting means responsive to said rate coincidence signal for detecting whether or not said demodulated signal includes an input synchronizing signal identical with one of said predetermined synchronizing signals that is in correspondence to said adjudged bit rate, said synchronizing signal detecting means producing a synchronizing signal coincidence signal when said input synchronizing signal is identical with said one of predetermined synchronzing signals; and reception control means responsive to said synchronizing signal coincidence signal for controlling said reception operation, provided that said selective call signal comprises said specific call signal, in compliance with one of said predetermined formats that is in correspondence to said adjudged bit rate and to said one of predetermined synchronizing signals.

4. A selectively called radio receiver as claimed in claim 3, wherein said rate judging means comprises:

rate storing means responsive to a preceding portion of said demodulated signal for storing said predetermined bit rates as stored bit rates from said memory means; and rate comparing means responsive to said demodulated signal for comparing said input bit rate with each of said stored bit rates to produce one of said stored bit rates as said adjudged bit rate that is substantially identical with said input bit rate.

5. A selectively called radio receiver as claimed in claim 4, wherein said rate comparing means comprises:

a noise canceller for cancelling noise from said demodulated signal to produce a noise cancelled signal;

an edge position detector for detecting points of variation of a signal level in said noise cancelled signal as a detected bit rate; and a comparator for comparing said detected bit rate with said stored bit rates to judge said input bit rate as said adjudged bit rate to produce said rate coincidence signal representative of said adjudged bit rate when said detected bit rate is substantially identical with said one of stored bit rates.

6. A selectively called radio receiver as claimed in claim 5, wherein said comparator produces a preliminary signal representative of said adjudged bit rate when said detected bit rate is first in coincidence with said one of stored bit rates within a predetermined error range, said comparator again comparing said detected bit rate with said one of stored bit rates in response to said preliminary signal to ultimately produce said rate coincidence signal when said detected bit rate is in coincidence with said one of stored bit rates once more within said predetermined error range.

7. A selectively called radio receiver as claimed in claim 3, wherein said synchronizing signal detecting means comprises:

a shift register responsive to said demodulated signal for bit parallel producing said input synchronizing signal as an output bit pattern in compliance with each of ones of said predetermined formats that are in correspondence to said adjudged bit rate; and a pattern matching circuit responsive to said rate coincidence signal for storing therein from said memory means in compliance with said each of ones of predetermined formats at least one of said predetermined synchronizing signals as a stored bit pattern that is in correspondence to said adjudged bit rate, said pattern matching circuit pattern matching said input pattern with said stored bit pattern to produce said synchronizing signal coincidence signal when said output pattern is in pattern match with said stored bit pattern.

8. A selectively called radio receiver as claimed in claim 3, wherein:

said memory means still further memorizes said specific call signal as at least one predetermined identification code in correspondence to each predetermined synchronizing signal;

said reception control means comprising:

code collating means responsive to said synchronizing signal coincidence signal for referring to said memory means to collate an input identification code in said at least one selective call signal with said at least one predetermined identification code and to produce a collation signal when said input identification code is included in said at least one predetermined identification code; and reception means responsive to said collation signal for proceeding with said reception operation.

* * * * *

UNITED STATES PATENT AND TRADEMARK OFFICE
CERTIFICATE OF CORRECTION

PATENT NO. : 5,862,467
DATED : January 19, 1999
INVENTOR(S) : Mafumi Miyoshita

It is certified that error appears in the above-identified patent and that said Letters Patent is hereby corrected as shown below:

Column 9, Line 46, Claim 3: "wand" should read --and--

Signed and Sealed this

Twenty-seventh Day of June, 2000

*Attest:*

Q. TODD DICKINSON

*Attesting Officer*     *Director of Patents and Trademarks*